United States Patent [19]

Naylor, Jr.

[11] Patent Number: 5,168,595

[45] Date of Patent: Dec. 8, 1992

[54] WINDSHIELD WIPER BLADE AND ASSEMBLY

[76] Inventor: James L. Naylor, Jr., Rte. 2, Box 1057, Climax, Ga. 31734

[21] Appl. No.: 697,252

[22] Filed: May 8, 1991

[51] Int. Cl.⁵ ............................................. B60S 1/28
[52] U.S. Cl. .............................. 15/250.40; 15/250.41; 15/250.37; 15/250.42; 15/250.33
[58] Field of Search ........... 15/250.01, 250.11, 250.19, 15/250.20, 250.22, 250.23, 250.27, 250.28, 250.29, 250.33, 250.36, 250.37, 250.40–250.42

[56] References Cited

U.S. PATENT DOCUMENTS

| | | | |
|---|---|---|---|
| 716,157 | 12/1902 | Wheeler | 15/250.01 |
| 988,215 | 3/1911 | Shryock | 15/250.11 |
| 1,773,900 | 8/1930 | Kaufman | 15/250.11 |
| 1,922,078 | 8/1933 | Curry | 15/250.11 |
| 2,085,608 | 6/1937 | Rodrick | 15/250.40 |
| 2,094,206 | 9/1937 | Dudley | 15/250.37 |
| 2,229,719 | 1/1941 | Bramming | 15/250.36 |
| 2,722,701 | 11/1955 | Blum et al. | 15/250.36 |
| 3,434,976 | 7/1969 | Kijinski | 15/250.01 |
| 3,638,274 | 2/1972 | Farver | 15/250.41 |
| 3,892,006 | 7/1975 | Yasumoto | 15/250.36 |
| 4,327,457 | 5/1982 | Lunsford | 15/250.41 |
| 4,649,593 | 3/1987 | Gilliam, III et al. | 15/250.36 |
| 4,719,661 | 1/1988 | Hanselmann | 15/250.41 |
| 4,745,653 | 5/1988 | Bliznak | 15/250.41 |

FOREIGN PATENT DOCUMENTS

| | | | |
|---|---|---|---|
| 935297 | 11/1955 | Fed. Rep. of Germany | 15/250.37 |
| 2619633 | 11/1977 | Fed. Rep. of Germany | 15/250.41 |
| 55780 | 10/1935 | Norway | 15/250.23 |
| 468866 | 7/1937 | United Kingdom | 15/250.37 |
| 873861 | 7/1961 | United Kingdom | 15/250.37 |
| 8001155 | 6/1980 | World Int. Prop. O. | 15/250.40 |

Primary Examiner—Harvey C. Hornsby
Assistant Examiner—Gary K. Graham
Attorney, Agent, or Firm—Hopkins & Thomas

[57] ABSTRACT

A windshield wiper assembly for use with a driven wiper arm for cleaning a windshield comprises a wiper blade arm assembly adapted to be mounted to the driven wiper arm and including an elongated support frame, an elongated blade carrier pivotally mounted to the support frame, and first and second blades mounted to the blade carrier. Means are provided for pivoting the blade carrier between a first position in which the first blade is positioned for contacting the windshield and the second blade is positioned to be spaced from the windshield and a second position in which the first blade is positioned to be spaced from the windshield and the second blade is positioned for contacting the windshield. By making the blades of different compositions, different cleaning tasks can be effectively accomplished, as for example removing ice or insects. Alternatively, a wiper blade comprises two sections made of different materials.

4 Claims, 3 Drawing Sheets

WINDSHIELD WIPER BLADE AND ASSEMBLY

TECHNICAL FIELD

The present invention relates to windshield wipers, and more particularly relates to a windshield wiper blade and assembly for use with a driven wiper arm for cleaning a windshield.

BACKGROUND OF THE INVENTION

Windshields of vehicles are typically cleaned using a wiper assembly mounted to a driven wiper arm or driving arm which is mounted for oscillating pivotal movement to effect a back-and-forth wiping motion of the wiper assembly across the windshield. The wiper assembly typically includes a blade arm or blade arm assembly to which a rubber wiper blade is secured. Wiper blades made of rubber have proven to be especially well suited for cleaning unwanted water from a windshield.

One of the problems with known wiper assemblies is that the rubber wiper blade typically included in the assembly is poorly suited for certain windshield cleaning jobs. For example, a rubber wiper blade is not as effective as a hard scraper for removing frost or ice from a windshield. Also, a rubber wiper blade often will not effectively remove insects, dirt or other debris from the windshield. While it might be possible to temporarily replace the rubber wiper blade with a wiper blade of a material more suited to the particular cleaning task at hand, such is not a practical solution since the primary and usual purpose of windshield wipers is to squeegee off excess water for clearer vision. Other more abrasive materials will not work as well for this purpose. This shortcoming is aggravated by the relative inconvenience of changing wiper blades to suit the particular cleaning task at hand, particularly when the vehicle is in operation.

U.S. patent Ser. No. 4,745,653 of Bliznak discloses a wiper/scraper/washer blade for windshields in which a multiple edged wiper blade is rotably mounted to a blade arm so that one can manually rotate the wiper blade and select the type of blade edge appropriate for the particular cleaning task at hand. For example, Bliznak discloses a hard-pointed edge for cutting through ice and softer edges for acting as a squeegee. One drawback to the wiper/scraper/washer blade of Bliznak is that to change blade edges, one would typically stop operation of the windshield wipers and manually rotate the blade. Obviously, this can be impractical or inconvenient in adverse weather conditions or while the vehicle is moving.

SUMMARY OF THE INVENTION

Briefly described, in a preferred form the present invention comprises a windshield wiper assembly for use with a driven wiper arm for cleaning a windshield of a vehicle. The windshield wiper assembly comprises a blade arm assembly adapted for mounting to the driven wiper arm and includes an elongated support frame and an elongated blade carrier pivotally mounted to the support frame. First and second blades are mounted to the blade carrier and means are provided for pivoting the blade carrier between a first position in which the first blade is positioned for contacting the windshield and the second blade is positioned to be spaced from the windshield, and a second position in which the first blade is positioned to be spaced from the windshield and the second blade is positioned for contacting the windshield. Preferably, one of the blades is made of rubber while the other blade is made of a different material. For example, one of the blades can be made of a substantially rigid material, such as plastic, for scraping ice off the windshield. Conversely, one of the blades can be made of a material encased in netting for scrubbing insects and other debris off the windshield. Preferably, the means for pivoting the blade carrier comprises an electrically powered solenoid actuator so that the blade carrier can be pivoted without the necessity of the operator of the vehicle getting out of the vehicle to manually switch from one blade to another.

In another preferred form, the invention comprises a wiper blade for use in a windshield wiper assembly for cleaning a windshield, the wiper blade comprising an elongated member which is adapted to be secured to the windshield wiper assembly. The elongated member includes a generally tapered Portion for engaging the windshield, the tapered Portion including first and second face portions for cleaning the windshield, with one of the face portions made of a material different than the other face portion. For example, one of the face portions can be made of a material which is well suited for scrubbing debris from the windshield, while the other face portion is made of rubber for squeegeeing or wiping water from the windshield. As this embodiment of the wiper assembly is moved back and forth in opposite directions, the scrubbing face Portion scrubs material in one part of the stroke, while the wiping face portion wipes the windshield clean of any excess water in the other part of the stroke.

Accordingly, it is an object of the present invention to provide a windshield wiper blade and assembly which is durable in structure, economical to manufacture and efficient in operation.

It is another object of the present invention to provide a windshield wiper blade and assembly which is effective for removing a wide range of unwanted material from the windshield, such as water, mud, dirt, insects, snow, ice, etc.

It is another object of the present invention to Provide a windshield wiper blade and assembly which allows an operator of the vehicle to scrub or scrape the windshield without getting out of the vehicle.

It is another object of the invention to provide a windshield wiper blade and assembly which can remove debris from the windshield while maintaining a long service life.

Other objects, features and advantages of the present invention will become apparent upon reading the following specification in conjunction with the accompanying drawing figures.

DESCRIPTION OF THE DRAWING FIGURES

DETAILED DESCRIPTION

Figure 1:
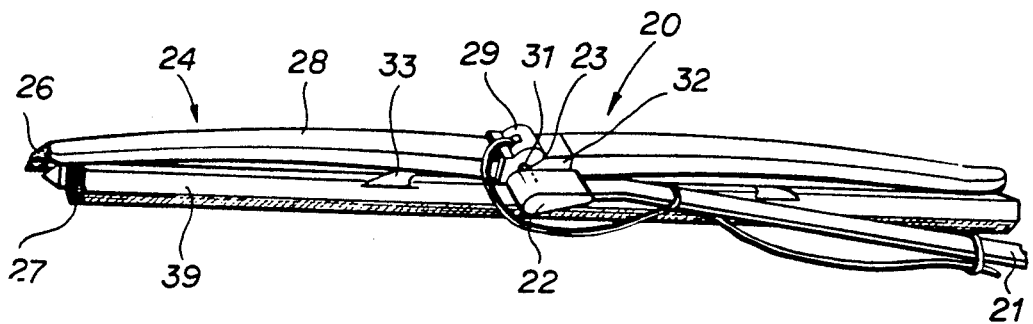
FIG. 1 is a perspective illustration of a windshield wiper assembly according to a first preferred form of the invention, with the windshield wiper assembly shown mounted to a driven wiper arm of a vehicle.

Referring now in detail to the drawing figures, in which like reference numerals represent like parts throughout the several views, FIGS. 1-6 show a windshield wiper assembly 20 according to a preferred form of the invention. As depicted in FIG. 1, windshield wiper assembly 20 is adapted to be mounted to a conventional driven wiper arm 21, of which only a Portion is shown in FIG. 1. Driven wiper arm 21 is in turn mounted to a wiper shaft (unshown) and is driven back and forth across the windshield of the vehicle by an unshown motor. The driven wiper arm typically includes a spring for biasing a wiper assembly mounted to the driven wiper arm against the windshield to maintain contact between the wiper assembly and the windshield, as is well-known in the art.

Windshield wiper assembly 20 is mounted to an adaptor 22 which is mounted on an end of driven wiper arm 21. Adaptor 22 includes a shaft 23 fixably mounted thereto for engaging assembly 20 in journaled fashion. Wiper assembly 20 includes a blade arm assembly indicated at 24 which supports first and second wiper blades 26 and 27. As is well known in the art, the blade arm assembly 24 can be constructed as a relatively rigid flat member for use with flat windshields, or can be constructed to be flexible to maintain contact with curved windshields.

In the illustrative embodiment disclosed herein, blade arm assembly 24 includes a generally bow-shaped, elongated support frame 28. A reinforcing bracket 29 is positioned centrally along elongated support frame 28 and is generally u-shaped for straddling the elongated support frame. The reinforcing bracket 29 defines an aperture 31 defined by a first face 32 of reinforcing bracket 29. A similar unshown second face of reinforcing bracket 29 lies opposite the first face and also defines an unshown aperture aligned with aperture 31. Shaft 23 is rotably received within the aligned apertures and unshown means are provided for releasably retaining the shaft within the apertures. Blade arm assembly 24 also includes intermediate support members 33 secured to elongated support frame 28.

Figure 6:
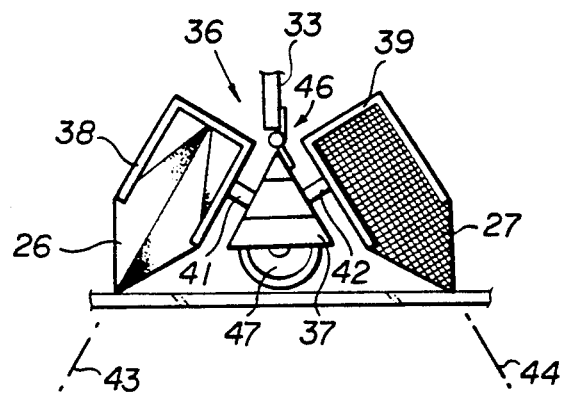
FIG. 6 is a schematic end view of a portion of the windshield wiper assembly of FIG. 1 shown positioned against a windshield.

A blade carrier assembly indicated generally at 36 comprises an elongated support beam 37 having a triangular cross-section. As illustrated in FIG. 6, first and second elongated blade holders 38 and 39, each having a U-shaped cross-section, are mounted to the support beam 37 by means of struts 41 and 42. Blade holders 38 and 39 are adapted for holding the wiper blades 26 and 27 and are oriented so that the blade holders are oriented along axes 43 and 44 which are oriented 120 degrees apart from one another, as shown in FIG. 6. Support beam 37 is pivotally mounted to the intermediate support member 33 by means of a hinge 46 mounted to a lower Portion of intermediate support member 33 and mounted to an upper portion of support beam 37. Additionally, support beam 37 can be hingedly mounted to the intermediate support member 33 at the ends of the support beam.

Figure 7:
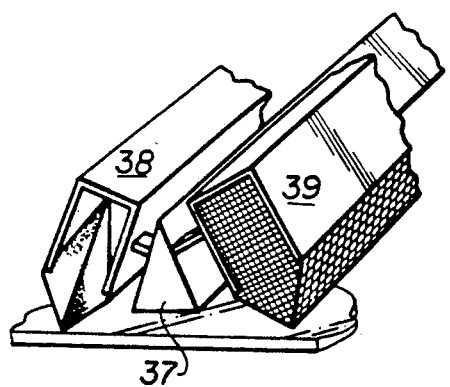
FIG. 7 is a schematic perspective illustration of a portion of the windshield wiper assembly of FIG. 1 in a modified form.

As shown in FIG. 6, one or more nylon rollers 47 can be rotatably mounted to a bottom portion of the support beam 37 to help support the windshield wiper assembly upon the windshield during transitions from using alternate wiper blades. Alternatively, as shown in FIG. 7, the nylon roller can be omitted.

In the above discussion, it will be apparent to those skilled in the art that some of the structural elements of the blade arm assembly, which have been described in connection with one-half of the blade arm assembly as shown in FIGS. 2-4 and 6-7, can be duplicated in the other half of the blade arm assembly.

As shown in FIGS. 2-5, a cam means 51 is provided for pivoting the blade carrier between a first position in which the first blade is positioned for contacting the windshield W and the second blade is positioned to be spaced from the windshield, and a second position in which the first blade is positioned to be spaced from the windshield W and the second blade is positioned for contacting the windshield. Cam means 51 includes a cam body 52 which is nearly cylindrical in construction. Cam body 52 defines a wedge-shaped channel 53 for receiving the triangular support beam 37 therein. Cam body 52 is secured to the triangular support beam 37 by means of a threaded fastener 54 which is received in a hole 56. An unshown hole extends through the triangular support beam 37 and an additional hole (also unshown) is formed in the cam body 52, with these three holes being aligned for receiving the threaded fastener 54. A second threaded fastener and series of holes can be provided also.

Figure 4:
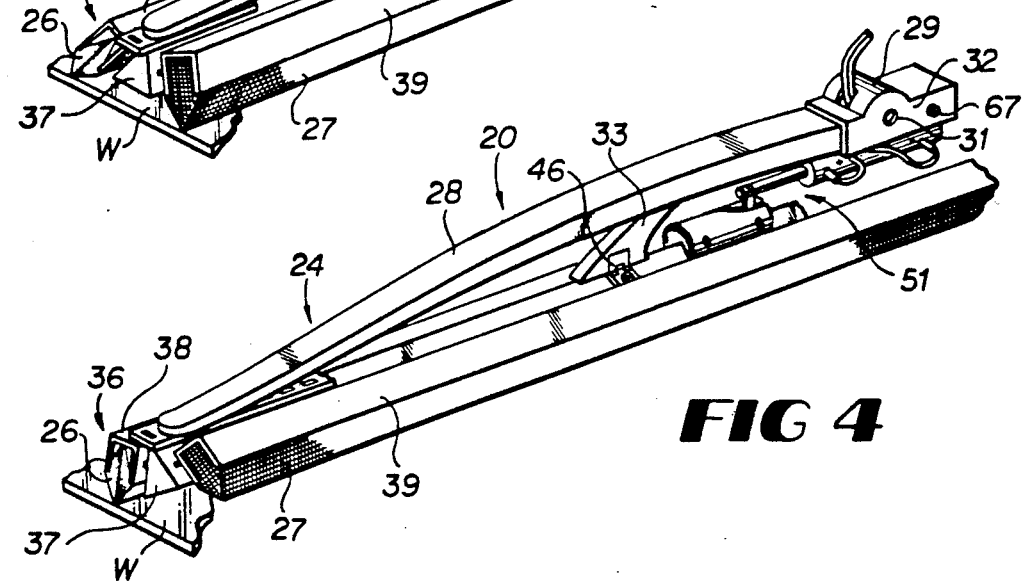
FIG. 4 is a perspective illustration of a portion of the windshield wiper assembly of FIG. 1 with a movable portion of the windshield wiper assembly shown in a third position.
Figure 5:
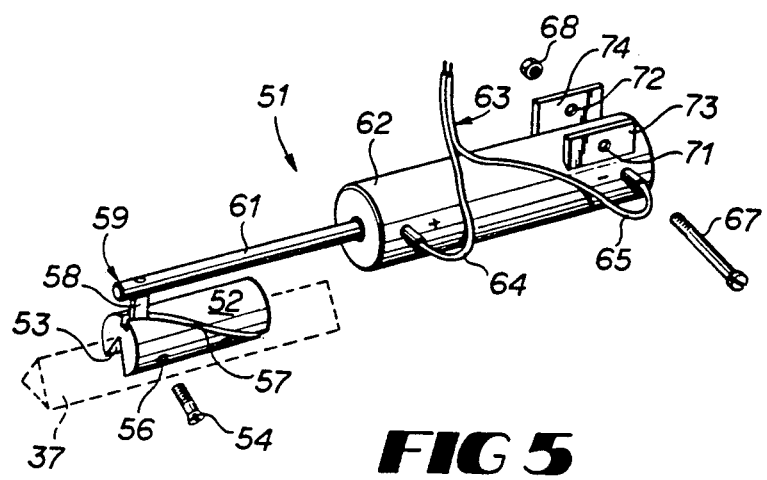
FIG. 5 is a schematic perspective illustration of a portion of the windshield wiper assembly of FIG. 1.

Cam body 52 defines a helical cam track or slot 57 for receiving therein a cam member 58. One end of cam member or follower 58 is slidably received within the helical cam track 57 and an opposite end of the follower is rigidly secured to an end 59 of a connecting rod 61. Connecting rod or actuating rod 61 is moved between an extended position shown in FIGS. 2 and 5 and a retracted position as shown in FIG. 4 by means of an actuator cylinder 62. Actuator cylinder 62 comprises a two-position solenoid and is configured so that when electrical power is not provided to the actuator cylinder, the actuating rod is held in the retracted position. Cylinder 62 is provided with electrical power by means of electrical cable 63, including a positive cable 64 and a negative cable 65. Typically, cable 63 would be connected with an appropriate electrical switch (unshown) for selectively providing the actuation cylinder with electrical power, which is provided by the vehicle's battery.

Actuator cylinder 62 is mounted near its end opposite the connecting rod 61 to the reinforcing bracket 29 by means of a bolt 67 extending through the reinforcing bracket and secured thereto by a threaded nut 68. Bolt 67 also passes through apertures 71 and 72 which are defined by upstanding mounting tabs 73 and 74. Mounting tabs 73 and 74 are planar and are parallel to each other, with the apertures 71 and 72 being aligned with one another and aligned with the apertures formed in the reinforcing bracket 29 for receiving the bolt 67.

Figure 8:
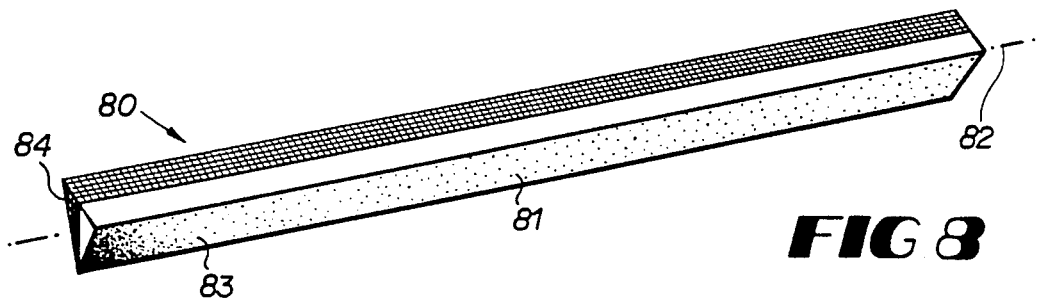
FIG. 8 is a schematic perspective illustration of a wiper blade according to a second preferred form of the invention.

FIGS. 8-11 show a second preferred form of the invention comprising a wiper blade assembly or insert 80 for use in a conventional windshield wiper assembly for cleaning a windshield. As shown in FIG. 8, wiper blade 80 comprises an elongated resilient member 81 adapted to be secured to the windshield wiper assembly of a vehicle. It will be understood that the wiper blade illustrated in FIGS. 8-11 is merely schematic and is for purposes of illustration only and that other shapes can be employed as required by the particular mounting application.

As shown in FIG. 8, elongated member 81 defines an axis of elongation 82 which bisects the elongated member 81 into first and second sections 83 and 84. First section 83 is a mirror image of second section 84. First section 83 is made of a resilient material, such as rubber, as is well known in the art. On the other hand, second section 84 is made of a different material, the two sections being fused together as by heat or adhesives. Second section 84 is made of a material which is well suited for scrubbing debris from the windshield, while first section 83 is intended primarily for wiping excess water from the windshield. Second section 84 can be made of a wide variety of materials. For example, second section 84 can be made of a resilient material which is interlaced with a woven netting material. On the other hand, second section 84 can be made of a mat of non-woven fibers, as is commonly used in many scrubbing or scouring applications. Whatever the material chosen for second section 84, the important feature of this embodiment is that with the first and second sections 83 and 84 being made of different materials, the wiper blade can be better suited for a wide variety of cleaning problems.

Figure 9:
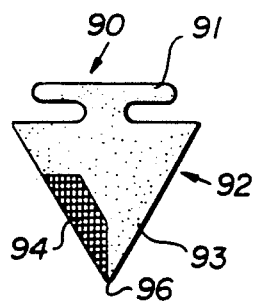
FIG. 9 is a sectional view of a modified form of the wiper blade of FIG. 8.
Figure 10:
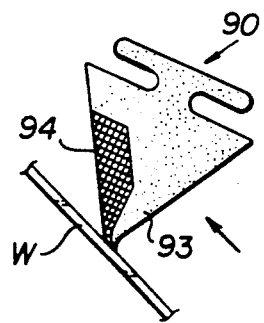
FIGS. 10 and 11 are schematic sectional views of the wiper blade of FIG. 9 shown positioned against a windshield as the wiper blade moves to and fro on the windshield.
Figure 11:
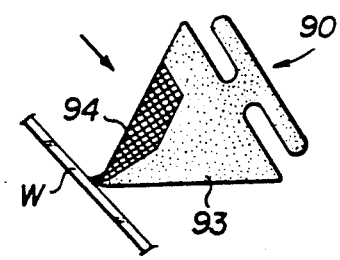

FIGS. 9-11 illustrate a variation of wiper blade 80, in which instead of making one entire half of the wiper blade of the scrubbing material, only a relatively small portion of the wiper blade is made of the scrubbing material. FIG. 9 shows a sectional view of a wiper blade 90 including a resilient mounting flange 91. Wiper blade 90 includes a generally tapered portion 92 which defines a first face portion 93 and a second face portion 94. Face portions 93 and 94 meet at a corner or tip 96. Face portion 93 is made of a resilient material as is well known in the art, while face portion 94 is made of a different material, preferably a scrubbing material as described above. As shown in FIGS. 10 and 11, as the wiper blade moves back and forth across the surface of the windshield W, the face portions 93 and 94 contact the windshield, while the remainder of the wiper blade does not contact the windshield. Therefore, it is only necessary to make the face portions 93 and 94 of different materials to achieve the advantage of providing a wiper which is more effective for a broad range of cleaning problems than a single composition wiper blade.

OPERATION

Figure 2:
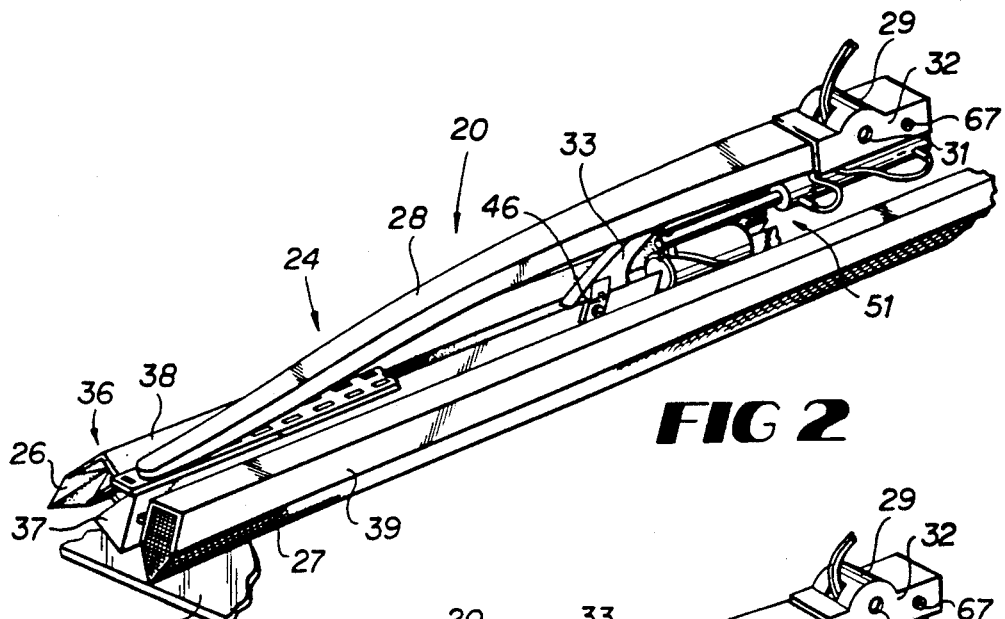
FIG. 2 is a perspective illustration of a portion of the windshield wiper assembly of FIG. 1 with a movable portion of the windshield wiper assembly shown in a first position.
Figure 3:
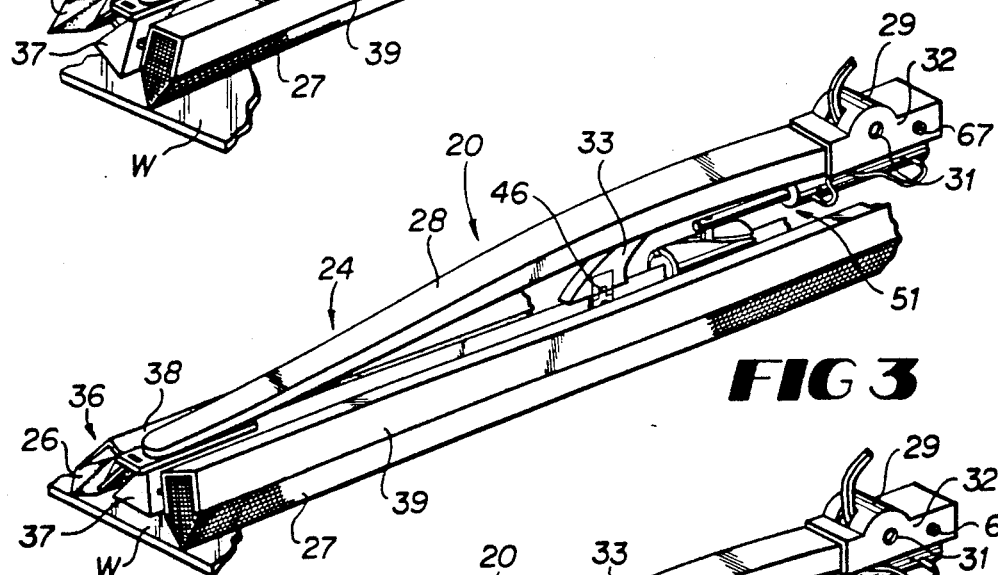
FIG. 3 is a perspective illustration of a portion of the windshield wiper assembly of FIG. 1 with a movable portion of the windshield wiper assembly shown in a second position.

In use, the apparatus according to the first preferred form of the invention can be selectively switched between a wiping mode of operation for wiping excess water from the windshield and a scrubbing or scraping mode of operation for removing insects, dirt, snow, ice or other debris, as shown in FIGS. 2-4. FIG. 4 shows the windshield wiper assembly in its normal or usual state in which no electrical power is applied to the solenoid so that the solenoid remains in its retracted position, causing the windshield wiper assembly to be configured to have the first wiper blade 26 (the resilient wiper blade) engaging the windshield W for supporting the windshield wiper assembly upon the windshield. This is chosen as the normal or nominal configuration so that in the event of a failure of the solenoid or of the electrical circuit (unshown) which controls the solenoid, the windshield wiper functions in a conventional and safe manner.

To change from this wiping blade to the scrubbing blade as shown in FIG. 2, typically one operates an unshown electrical switch for delivering electrical power to the solenoid to cause the solenoid to extend the connecting rod 61. As the connecting rod 61 is extended, the cam member 58 moves along within the cam track 57 and causes the cam body 52 to rotate. This rotation of the cam body 52 causes the elongated member 37 to pivot with respect to the elongated support frame 28 of the blade arm assembly 20. In this way, the wiping blade 26 is swung out of the way from the configuration of FIG. 4 to the configuration of FIG. 2 in which the scrubbing blade 27 is positioned to engage the windshield W for supporting the windshield wiper assembly on the windshield. The windshield wiper assembly can likewise be switched from the configuration of FIG. 2 to the configuration of FIG. 4 by interrupting the delivery of electrical power to the solenoid causing a tension means (not shown) in the solenoid to retract rod 61.

This ability to switch back and forth between the two wiper blades, with the wiper blades being of different materials, provides substantial performance improvements over what is known in the art. For example, one of the wiper blades can be adapted for scraping ice and snow off a windshield, while the other wiper blade is adapted for the wiping of excess water. With this construction, one can scrape ice from the windshield by operation of the windshield wipers, without getting out of the vehicle and scraping manually. This operation can continue as long as it takes to remove or substantially remove the debris, before causing the resilient blade to contact the windshield. Once the windshield is clear of ice, one can switch back to the rubber wiping blade to keep the windshield free of excess water. Thus, the resilient blade is not damaged by being forced against the debris.

The ability to switch back and forth between first and second wiper blades of different compositions also has a substantial beneficial use in climates which do not experience ice and snow. For example, in many locales during certain times of the year the air can become so thick with insects that as one drives a vehicle, the windshield becomes encrusted with smashed insects so that visibility through the windshield is substantially diminished. Using the invention disclosed herein, one can easily clear the windshield of insect debris by using a scrubbing blade or coarse wiper blade to scrape the bugs off the windshield and then by using the wiping blade, particularly in combination with the application of windshield washing fluid as is commonly provided on most vehicles, to finish the cleaning.

It will be observed that the embodiment of FIGS. 8-11 is particularly well suited to removing bugs and other debris from the windshield. In the embodiment of FIGS. 8-11, one need not even select between two different wiper blades, but rather as the wiper blade is moved to and fro across the windshield, the different wiping faces of the wiping blade are presented to the windshield. With the wiping faces being of different compositions, the debris can be effectively dislodged by the scrubbing face as it moves across and engages the windshield and the windshield can be wiped clean with the rubber or squeegee face of the wiper blade as that face moves across the windshield.

Both illustrative embodiments of the invention disclosed herein tend to provide a long service life by protecting the rubber wiper blade from attempting to clear the windshield of difficult debris.

While the invention has been disclosed in preferred forms only, it is to be understood that many additions, deletions and modifications may be made therein without departing from the spirit and scope of the invention as set forth in the appended claims.

I claim:

1. A windshield wiper assembly for use with a driven reciprocating wiper arm for cleaning a windshield of a vehicle, comprising:
    a blade arm assembly adapted to be mounted to and carried by the driven wiper arm and comprising an elongated support frame, and an elongated blade carrier pivotally mounted to said support frame;
    a first blade and a second blade mounted side-by-side to said blade carrier on opposite sides of said blade carrier, said first blade and said second blade both protruding toward said windshield;
    means for pivoting said blade carrier between a first position in which said first blade is contacting the windshield and said second blade is adjacent to and spaced from the windshield, and a second position in which said first blade is adjacent to and spaced from the windshield and said second blade is contacting the windshield; and
    said means for pivoting said blade carrier comprising a cam track mounted to said blade carrier, a cam member movably mounted in said cam track and means for moving said cam member with said cam track.

2. A windshield wiper assembly as claimed in claim 1 wherein said means for moving said cam member comprises a connecting rod mounted to said cam member and means mounted to said support frame for moving said connecting rod between extended and retracted positions.

3. A windshield wiper assembly as claimed in claim 2 wherein said means mounted to said support frame for moving said connecting rod comprises a two-position solenoid.

4. A windshield wiper assembly for use with a driven reciprocating wiper arm for cleaning a windshield of a vehicle, comprising:
    a blade arm assembly adapted to be mounted to and carried by the driven wiper arm and comprising an elongated support frame, and an elongated blade carrier pivotally mounted to said support frame;
    a first blade and a second blade mounted side-by-side to said blade carrier on opposite sides of said blade carrier, said first blade and said second blade both protruding toward said windshield;
    means for pivoting said blade carrier between a first position in which said first blade is contacting the windshield and said second blade is adjacent to and spaced from the windshield, and a second position in which said first blade is adjacent to and spaced from the windshield and said second blade is contacting the windshield; and
    a roller pivotally mounted to said blade carrier intermediate said first and second blades for movably supporting said blade carrier upon the windshield as said blade carrier is pivoted between said first and second positions.

* * * * *